United States Patent
Hughes et al.

(10) Patent No.: US 8,811,528 B2
(45) Date of Patent: Aug. 19, 2014

(54) METHODS AND APPARATUS FOR TRANSMITTING SIGNALS WITH SELECTIVE DELAY FOR COMPENSATION OF INTERSYMBOL INTERFERENCE AND SIMULTANEOUS SWITCHING OUTPUTS

(75) Inventors: Thomas Hughes, San Francisco, CA (US); Victor K. Suen, Fremont, CA (US)

(73) Assignee: LSI Corporation, San Jose, CA (US)

( * ) Notice: Subject to any disclaimer, the term of this patent is extended or adjusted under 35 U.S.C. 154(b) by 282 days.

(21) Appl. No.: 12/954,028

(22) Filed: Nov. 24, 2010

(65) Prior Publication Data

US 2012/0128097 A1 May 24, 2012

(51) Int. Cl.
*H04L 25/49* (2006.01)

(52) U.S. Cl.
USPC ........... 375/296; 375/295; 375/286; 375/219; 375/377; 375/371

(58) Field of Classification Search
USPC .................. 375/296, 295, 286, 219, 377, 371
See application file for complete search history.

(56) References Cited

U.S. PATENT DOCUMENTS

| | | | | |
|---|---|---|---|---|
| 6,043,682 | A * | 3/2000 | Dabral et al. | 326/86 |
| 7,187,721 | B1 * | 3/2007 | Dally et al. | 375/295 |
| 7,668,239 | B2 * | 2/2010 | Marlett et al. | 375/238 |
| 8,009,763 | B2 * | 8/2011 | Risk et al. | 375/296 |
| 8,036,303 | B2 * | 10/2011 | Oka | 375/295 |
| 2002/0181050 | A1 * | 12/2002 | Drost et al. | 359/152 |
| 2005/0265064 | A1 * | 12/2005 | Ku et al. | 365/120 |
| 2008/0069267 | A1 * | 3/2008 | Marlett et al. | 375/296 |
| 2009/0074407 | A1 * | 3/2009 | Hornbuckle et al. | 398/43 |
| 2009/0168941 | A1 * | 7/2009 | Zhang et al. | 375/371 |
| 2009/0252212 | A1 * | 10/2009 | Risk et al. | 375/231 |

* cited by examiner

*Primary Examiner* — Kenneth Lam
(74) *Attorney, Agent, or Firm* — Ryan, Mason & Lewis, LLP

(57) ABSTRACT

Transmitter-based techniques are provided for compensation of intersymbol interference and/or simultaneous switching outputs, using selective pulse width modulation. One or more signals are transmitted by detecting whether one or more of said signals satisfy one or more predefined signal corruption conditions, wherein said predefined signal corruption conditions indicate that one or more of said signals are anticipated to exhibit one or more of intersymbol interference and simultaneous switching outputs; and selecting a delay for one or more of the signals based on the one or more predefined signal corruptions conditions. The predefined signal corruption conditions comprise, for example, (i) digital data encoded in the one or more signals maintaining a same binary value for two or more consecutive clock cycles (to indicate intersymbol interference); and (ii) a predefined minimum number of aggressor data edges in digital data encoded in the one or more signals, and a corresponding predefined number of victim data edges in the digital data encoded in the one or more signals, wherein the victim edges are moving in an opposite direction to the aggressor data edges (to indicate simultaneous switching outputs).

11 Claims, 9 Drawing Sheets

200

250

METHODS AND APPARATUS FOR TRANSMITTING SIGNALS WITH SELECTIVE DELAY FOR COMPENSATION OF INTERSYMBOL INTERFERENCE AND SIMULTANEOUS SWITCHING OUTPUTS

FIELD OF THE INVENTION

The present invention relates generally to channel compensation techniques and, more particularly, to transmitter-based techniques for compensating for intersymbol interference and/or simultaneous switching outputs.

BACKGROUND OF THE INVENTION

Digital communication receivers must sample an analog waveform and then reliably detect the sampled data. Signals arriving at a receiver are typically corrupted by intersymbol interference (ISI), simultaneous switching outputs (SSO), crosstalk, echo, and other noise. For high speed interfaces, such as Double Data Rate (DDR) 3/4, ISI and SSO, for example, have been found to reduce the setup and hold margin of the received data to a data strobe, limiting the potential data rate.

In order to compensate for such channel distortions, communication systems often employ well-known pre-emphasis techniques in the transmitter or equalization techniques in the receiver (or both). On the receiver side, well-known zero equalization or decision-feedback equalization (DFE) techniques (or both) are often employed. Such equalization techniques are widely-used for removing intersymbol interference and other noise. See, for example, R. Gitlin et al., Digital Communication Principles, (Plenum Press, 1992) and E. A. Lee and D. G. Messerschmitt, Digital Communications, (Kluwer Academic Press, 1988), each incorporated by reference herein. Decision-feedback equalization utilizes a discrete-time feedback loop that adds a correction signal, which is a function of previously decoded symbol values, to the channel output.

A communication channel typically exhibits a low pass effect on a transmitted signal. Generally, zero equalization techniques employ a high pass filter to compensate for the low pass effect asserted by the channel. Conventional pre-emphasis techniques attempt to open the received data eye that has been band limited by the low pass channel response. While existing pre-emphasis techniques aim to compensate for channel distortions, they suffer from a number of limitations, which if overcome, could further improve the reliability of data recovery in the presence of channel distortions. For example, existing pre-emphasis techniques, such as changing the drive strength within a given pulse, are limited to serial ISI correction and do not attempt to resolve parallel SSO effects. In addition, existing pre-emphasis techniques within the analog input/output (IO) circuit are difficult to design across the wide range of variables associated with parallel data buses with source synchronous clocking.

A need therefore exists for improved channel compensation techniques that improve the reliability of data detection by a communication receiver.

SUMMARY OF THE INVENTION

Generally, transmitter-based techniques are provided for compensation of intersymbol interference and/or simultaneous switching outputs, using selective pulse width modulation. According to one aspect of the invention, one or more signals are transmitted by detecting whether one or more of said signals satisfy one or more predefined signal corruption conditions, wherein said predefined signal corruption conditions indicate that one or more of said signals are anticipated to exhibit one or more of intersymbol interference and simultaneous switching outputs; and selecting a delay for one or more of the signals based on the one or more predefined signal corruptions conditions.

The predefined signal corruption conditions comprise, for example, (i) digital data encoded in the one or more signals maintaining a same binary value for two or more consecutive clock cycles (to indicate intersymbol interference); and (ii) a predefined minimum number of aggressor data edges in digital data encoded in the one or more signals, and a corresponding predefined number of victim data edges in the digital data encoded in the one or more signals, wherein the victim edges are moving in an opposite direction to the aggressor data edges (to indicate simultaneous switching outputs).

In one exemplary embodiment, a nominal delay is applied to signals that do not satisfy the predefined signal corruptions conditions (i.e., to signals that are not anticipated to exhibit ISI or SSO), and a reduced delay, relative to the nominal delay, is applied to signals that do satisfy one or more predefined signal corruptions conditions (i.e., to signals that are anticipated to exhibit ISI and/or SSO).

A more complete understanding of the present invention, as well as further features and advantages of the present invention, will be obtained by reference to the following detailed description and drawings.

DETAILED DESCRIPTION

The present invention provides transmitter-based techniques for compensating for intersymbol interference and simultaneous switching outputs. According to one aspect of the invention, a time domain phase shift (a modulation of pulse width) is selectively applied to one or more signals in the transmitter, prior to the analog output driver, to compensate for ISO and/or SSO. As discussed hereinafter, the phase shifts applied in the transmitter cause a given edge in the transmit digital data to occur earlier in time in the presence of anticipated ISO and/or SSO, so that the receiver threshold can be reached by the received signal earlier in time. Generally, as discussed hereinafter, the transmit digital data is driven earlier in time in the presence of anticipated ISO and/or SSO by applying a reduced delay to the transmit digital data, relative to a default or nominal delay amount. The phase shifted transmit signal allows the fixed sampling point of the receiving device to compensate for the effects of ISI and SSO. The data bus and clock are monitored within the digital domain for predefined ISI and SSO conditions, and the phase shifts are selectively applied to compensate for the ISI and SSO effects that are predicted at the receiving device. The disclosed time domain phase shift can be implemented in the digital domain, where bus-wide SSO information is available.

Figure 1:
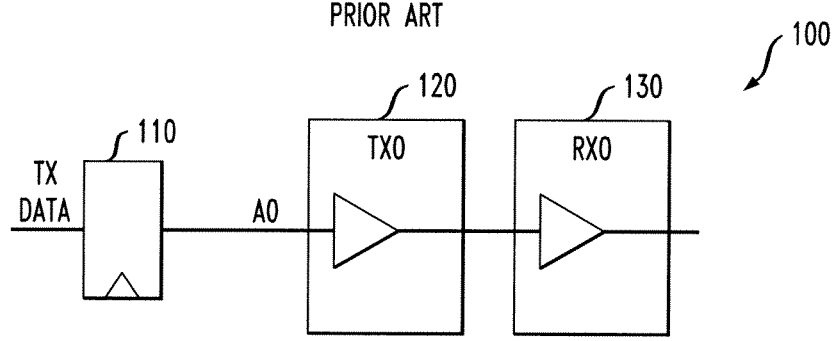
FIG. 1 is a schematic block diagram of an exemplary conventional serial transmitter/receiver circuit.

FIG. 1 is a schematic block diagram of an exemplary conventional serial transmitter/receiver circuit 100. As shown in FIG. 1, the exemplary conventional serial transmitter/receiver circuit 100 comprises a latch 110, as well as a transmitting device input/output (IO) 120 and a receiving device IO 130. The latch 110 processes the transmit data (TX Data) and generates a digital data signal A0. The transmitting device IO 120 processes and encodes the digital data signal A0 and generates a corresponding transmit signal TX0 for transmission. The receiving device IO 130 receives a version of the transmit signal TX0 and generates a receive signal RX0, in a known manner.

In the following discussion, a "nominal" time frame (Nom) is established relative to the rising and falling edges in a transmit clock (TX Clock). The "nominal" time frame, for example, may be achieved by applying a fixed delay to the transmit clock (TX Clock). In addition, an "early" time frame is established, in accordance with the present invention, that is earlier in time relative to the nominal time frame, by following an early circuit path with reduced delay. In one exemplary embodiment, the "early" time frame is established by applying a reduced delay to the transmit digital data, relative to a default or nominal delay amount that is applied for the "nominal" time frame. The "early" time frame is employed in accordance with the present invention to transmit signals in the presence of anticipated ISO and/or SSO, and the "nominal" time frame is employed to transmit signals when ISO and/or SSO are not anticipated. In a further variation, the "early" time frame can be established by delaying only the signals to be transmitted in accordance with the "nominal" time frame (i.e., apply a fixed delay to all transmit signals when ISO and/or SSO are not anticipated and apply no additional delay (or less delay than the fixed nominal delay) to all transmit signals in the presence of anticipated ISO and/or SSO). Of course, the particular signals that are delayed (or otherwise phase adjusted) to achieve the "early" and "nominal" time frames is a design choice, and any variation is within the contemplated scope of the invention.

Figure 2A:
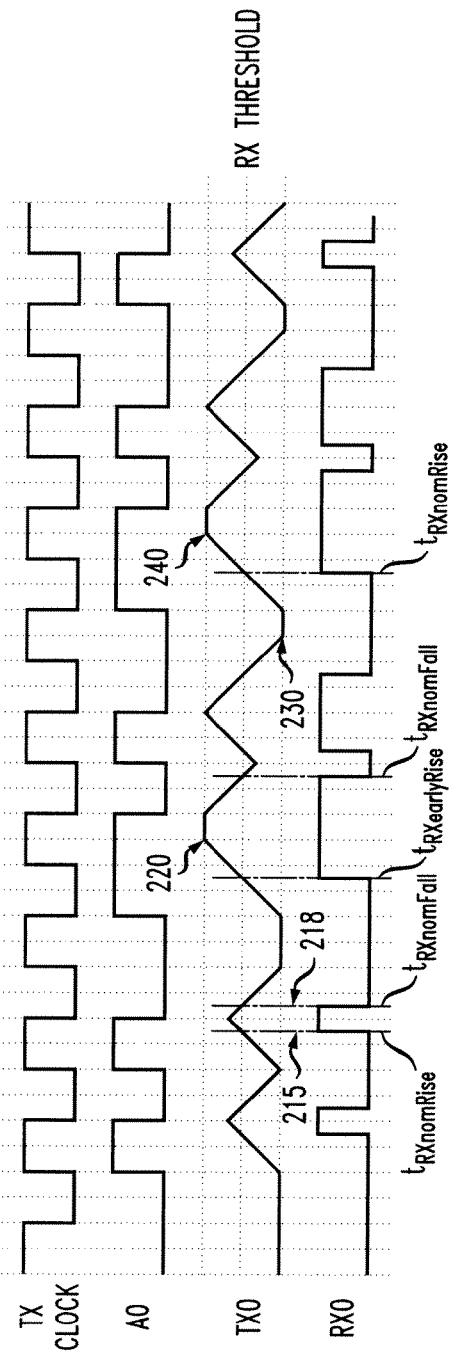
FIG. 2A is a set of waveforms associated with the exemplary conventional serial transmitter/receiver circuit of FIG. 1.

FIG. 2A is a set of waveforms 200 associated with the exemplary conventional serial transmitter/receiver circuit 100 of FIG. 1. As shown in FIG. 2A, the waveforms 200 comprise a transmit clock (TX Clock), the digital data signal (A0), and the corresponding transmit signal (TX0) and receive (RX0) signal. Generally, as used herein, the digital data signal A0 is a binary representation of the transmit data (TX Data) of FIG. 1 and the transmit signal TX0 is an encoded version of the digital data signal A0, in a known manner.

The receiving device IO 130 detects the received data based on a threshold, RX threshold. As shown in FIG. 2A, the exemplary RX0 signal exhibits a data value of binary one whenever the received version of TX0 exceeds the RX threshold. For example, a rising edge in the received signal RX0 is evident at a time $t_{RXnomRise}$, such as the rising edge in RX0 that occurs at time 215, when the received version of the transmit signal TX0 exceeds the RX threshold. Likewise, a falling edge in the received signal RX0 is evident at a time $t_{RXnomFall}$, such as the falling edge in RX0 that occurs at time 218, when the received version of the transmit signal TX0 falls below RX threshold.

When the digital data maintains the same binary value for two or more consecutive clock cycles, referred to herein as "predefined criteria for ISI," the TX0 signal will become saturated and go to the rail voltage, as shown at time instances 220, 230, 240. The waveforms 200 of FIG. 2A show the ISI distortion caused by the saturation of the transmit signal TX0 by the transmitting IO 120, when received by the receiving device 130.

Figure 2B:
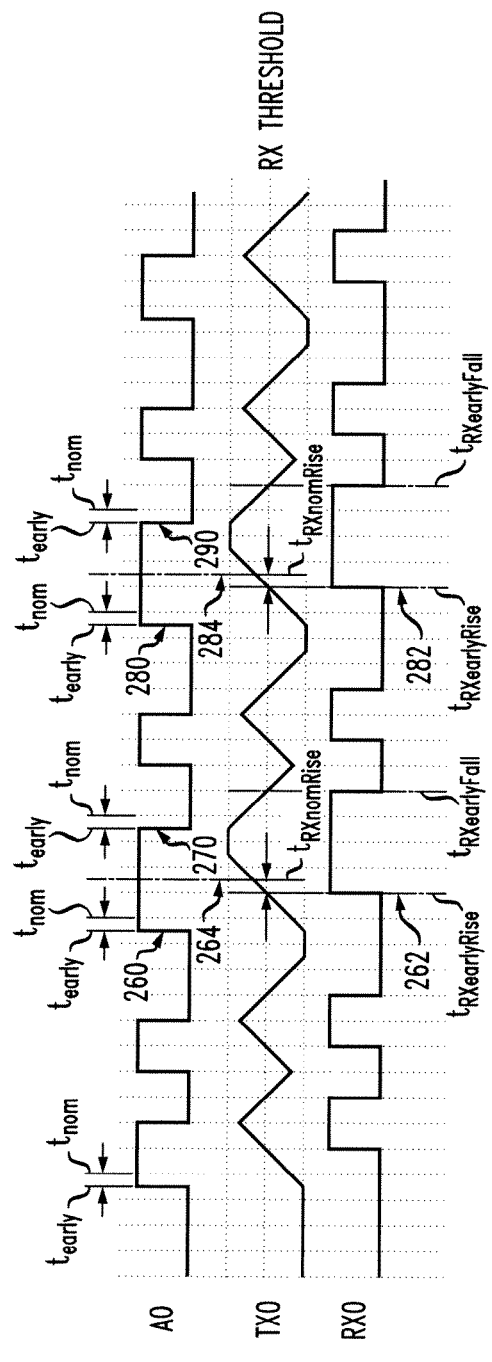
FIG. 2B is a set of waveforms where a pulse width modulation is applied to the transmitted signal for ISI correction in accordance with the present invention.

FIG. 2B is a set of waveforms 250 where a pulse width modulation has been applied in the transmitter to the digital data signal A0 for ISI correction in accordance with the present invention. An exemplary circuit for implementing the desired pulse width modulation is discussed further below in conjunction with FIG. 3.

The waveforms 250 of FIG. 2B comprise the digital data signal A0, and the corresponding transmit signal TX0 and receive signal RX0, in a similar manner to FIG. 2A. As discussed hereinafter, when the digital data signal A0 maintains the same data value for two or more consecutive clock cycles (e.g., maintains a data value of binary zero or binary one for two or more consecutive clock cycles), the present invention employs pulse width modulation on the digital data signal A0 to drive the transmit signal TX0 early and thereby correct for the anticipated ISI at the receiver. The application of pulse width modulation to the digital data signal A0 is discussed below in conjunction with FIG. 3.

As shown in FIG. 2B, the exemplary digital data signal A0 is selectively driven early in time, in accordance with the present invention, from a nominal time frame, $t_{nom}$, to an early time frame, $t_{early}$, to compensate for the anticipated ISI at the receiver, whenever the predefined criteria for ISI is detected. For example, the rising edge 260 and falling edge 270 in the exemplary digital data signal A0 occur earlier in time (than the nominal time frame) due to the detected predefined criteria for ISI that is associated with the saturation at time instance 220. Likewise, the rising edge 280 and falling edge 290 in the exemplary digital data signal A0 occur earlier in time (than the nominal time frame) due to the detected predefined criteria for ISI that is associated with the saturation at time instances 230, 240.

As discussed further below in conjunction with FIG. 3, the transmitting device IO will process the phase-shifted digital data signal A0 and generate a corresponding transmit signal TX0 for transmission. The receiving device IO receives a version of the transmit signal TX0 and generates a receive signal RX0.

When the digital data signal A0 is driven earlier in time in accordance with the present invention, the receiver threshold is likewise reached earlier in time by the received signal, relative to an uncompensated signal. For example, the conventional transmit signal TX0 in FIG. 2A crosses the RX threshold at a time 264, corresponding to a nominal RX threshold crossing time for a rising edge, $t_{RXnomRise}$. The phase shifted transmit signal TX0 of the present invention, however, allows the fixed sampling point of the receiving device to be reached earlier. In particular, as shown in FIG. 2B, the transmit signal TX0 in FIG. 2B crosses the RX threshold at an earlier time 262, corresponding to an early RX threshold crossing time for a rising edge, $t_{RXearlyRise}$. As indicated above, the exemplary RX0 signal exhibits a data value of binary one whenever the received version of TX0 exceeds the RX threshold. Thus, in the presence of anticipated ISI, the exemplary RX0 signal in FIG. 2B has a rising edge at a time $t_{RXearlyRise}$, that is earlier in time than the rising edge in the conventional (uncompensated) RX0 signal of FIG. 2A, which occurs at a time, $t_{RXnomRise}$.

Likewise, the conventional transmit signal TX0 in FIG. 2A crosses the RX threshold at a time 284, corresponding to the nominal RX threshold crossing time for a rising edge, $t_{RXnomRise}$. The phase shifted transmit signal TX0 of the present invention, shown in FIG. 2B, crosses the RX threshold at an earlier time 282, corresponding to an early RX threshold crossing time for a rising edge, $t_{RXearlyRise}$.

A similar time offset between the nominal and early time frames can be seen in FIG. 2B for a number of the falling edges. For example, the conventional transmit signal TX0 in FIG. 2A falls below the RX threshold at a nominal RX threshold crossing time for a falling edge, $t_{RXnomFall}$. The phase shifted transmit signal TX0 of the present invention, shown in FIG. 2B, crosses the RX threshold at an earlier RX threshold crossing time for a falling edge, $t_{RXearlyFall}$. As indicated above, the exemplary RX0 signal exhibits a data value of binary zero whenever the received version of TX0 falls below RX threshold. Thus, in the presence of anticipated ISI, the exemplary RX0 signal in FIG. 2B has a falling edge at a time, $t_{RXearlyFall}$, that is earlier in time than the falling edge in the conventional (uncompensated) RX0 signal of FIG. 2A, which occurs at a time $t_{RXnomFall}$.

Figure 3:
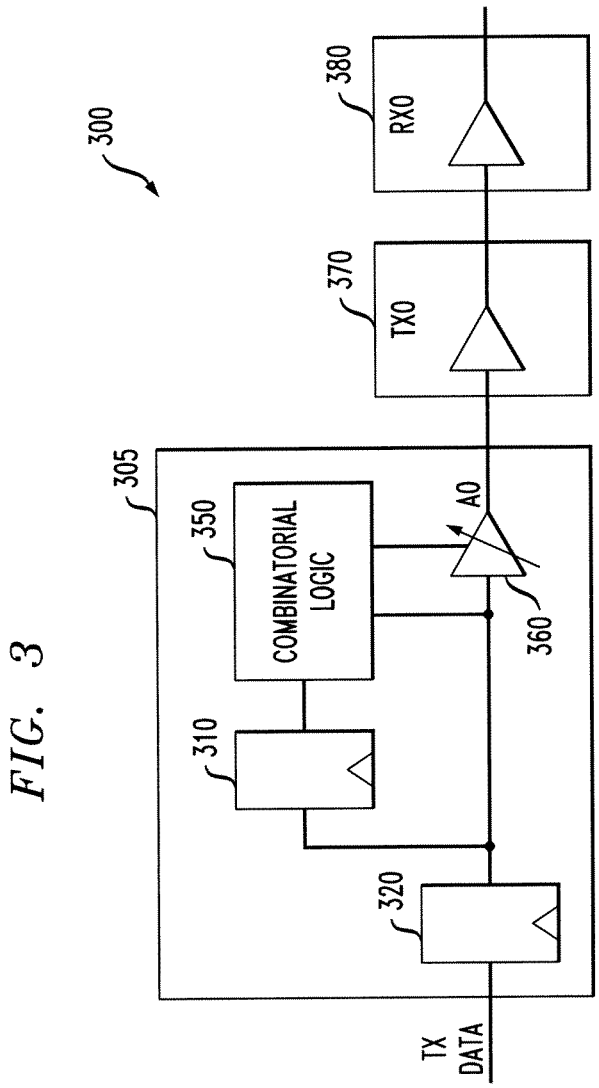
FIG. 3 is a schematic block diagram of an exemplary serial transmitter/receiver circuit incorporating ISI compensation in accordance with the present invention.

FIG. 3 is a schematic block diagram of an exemplary serial transmitter/receiver circuit 300 incorporating ISI compensation in accordance with the present invention. As shown in FIG. 3, the exemplary serial transmitter/receiver circuit 300 comprises an ISI compensation circuit 305, as well as a transmitting IO (TX0) 370 and a receiving device IO (RX0) 380. The transmitting IO (TX0) 370 and a receiving device IO (RX0) 380 operate in a similar manner to FIG. 1. The exemplary ISI compensation circuit 305 comprises two latches 310, 320, combinatorial logic 350 and a variable delay circuit 360. An exemplary implementation of the combinatorial logic 350 is discussed further below in conjunction with FIG. 8.

Generally, the exemplary combinatorial logic 350 processes the transmit data and selects a delay value for the variable delay circuit 360 based on whether or not the transmit data has two or more consecutive binary zeroes or ones (i.e., whether or not ISI is anticipated). For example, the combinatorial logic 350 can select a nominal delay value for the variable delay circuit 360 when the predefined criteria for ISI is not detected, and select a reduced (early) delay amount when the predefined criteria for ISI is detected.

As previously indicated, an aspect of the present invention drives the TX0 signal early, in the presence of anticipated ISI, when the transmit data has two or more consecutive binary zeroes or binary ones. This can be achieved, for example, by reducing the delay of the digital data signal A0, relative to a nominal delay amount, when the transmit data exhibits two or more consecutive binary zeroes or binary ones. Generally, the disclosed pulse modulation ISI correction is based on the present and saved (prior) serial data.

Figure 4:
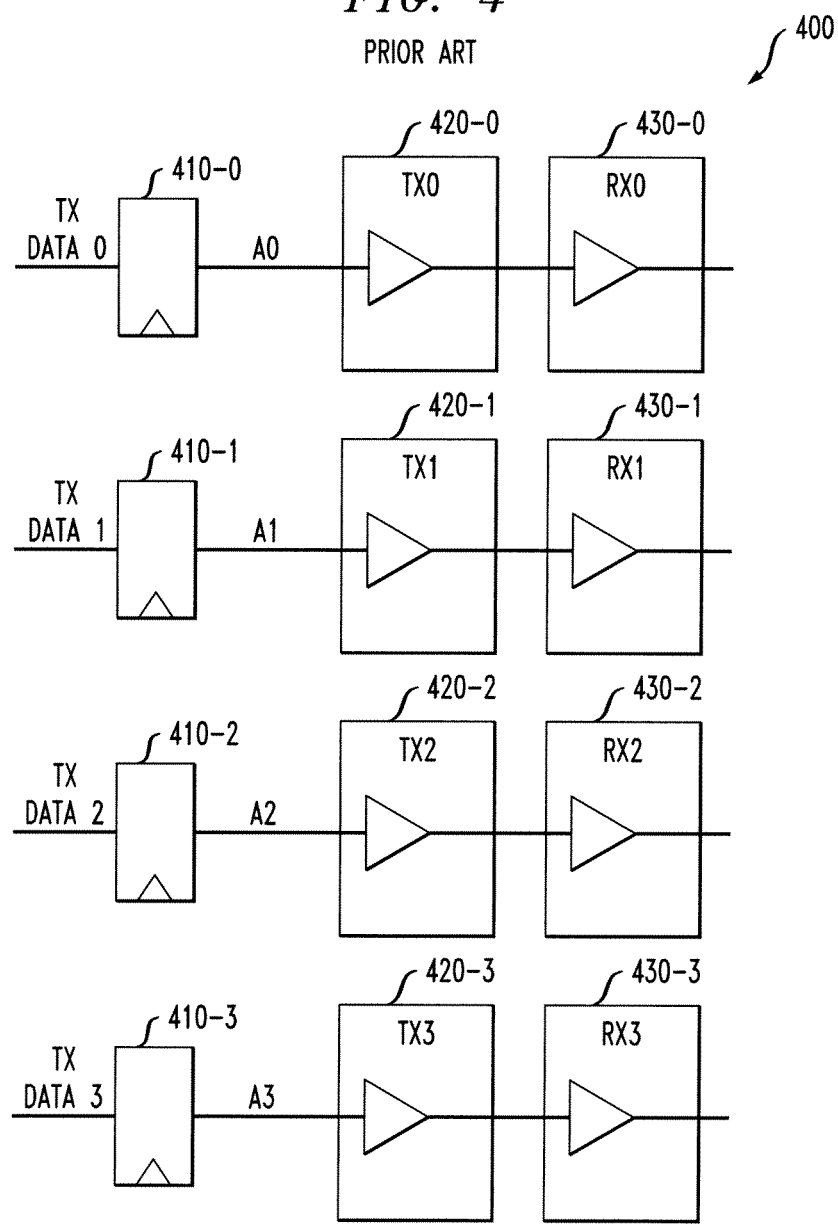
FIG. 4 is a schematic block diagram of an exemplary conventional parallel transmitter/receiver circuit.

FIG. 4 is a schematic block diagram of an exemplary conventional parallel transmitter/receiver circuit 400. As shown in FIG. 4, the exemplary conventional parallel transmitter/receiver circuit 400 comprises a latch 410-i, a transmitting IO 420-i and a receiving device IO 430-i for each branch, i, of the parallel bus. Each latch 410-i processes the corresponding transmit data (TX Data i) and generates a corresponding digital data signal Ai, Each transmitting device IO 420-i processes and encodes the corresponding digital data signal Ai and generates a corresponding transmit signal TXi for transmission. Each receiving device IO 130-i receives a corresponding version of the transmit signal TXi and generates a corresponding receive signal RXi, in a known manner.

Figure 5:
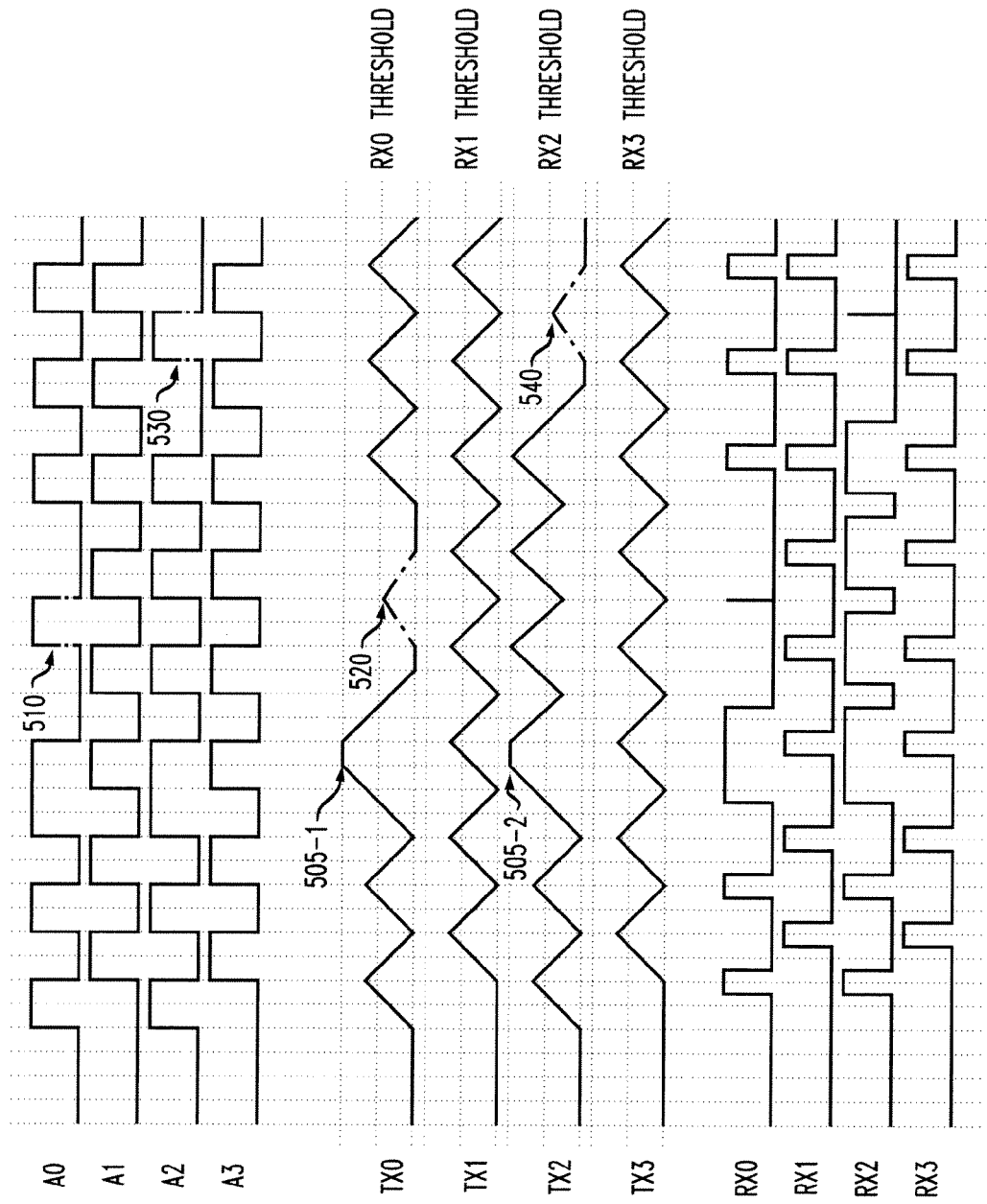
FIG. 5 is a set of waveforms associated with the exemplary conventional parallel transmitter/receiver circuit of FIG. 4.

FIG. 5 is a set of waveforms 500 associated with the exemplary conventional parallel transmitter/receiver circuit 400 of FIG. 4. The waveforms 500 exhibit both ISI and SSO interference. As shown in FIG. 5, the waveforms 500 comprise Ai, TXi and RXi signals for each branch, i, of the parallel bus. The receiving device IO 430 detects the received data based on a corresponding threshold, RXi threshold. When the digital data on a given branch, i, maintains the same binary value for two or more consecutive clock cycles, referred to herein as "predefined criteria for ISI," the corresponding TXi signal will become saturated and go to the rail voltage, as shown at time instances 505-1 and 505-2. The waveforms 500 show the ISI caused by the saturation of the transmit signal TXi by the corresponding transmitting IO (TXi), when received by the corresponding receiving device IO (RXi).

In addition, SSO distortion is also shown in FIG. 5. The present invention recognizes that SSO distortion will occur for one or more given data edges (often referred to as "victim edges") when a predefined minimum number of data edges (often referred to as "aggressor edges") are moving in the opposite direction to the victim data edges. As used herein, rising edges move in the opposite direction to falling edges, and vice versa. For example, in an exemplary four bit bus, SSO may be anticipated to occur, referred to herein as "predefined criteria for SSO," whenever three simultaneous data edges (the aggressor edges) are moving in the opposite direction to the remaining individual data edge (the victim edge). For example, the exemplary transmit signals Ai of FIG. 5 have two victim pulses 510, 530 (shown with dashed lines), that each have a rising victim edge that is moving in the opposite direction to the three falling aggressor edges. It is noted that a rising victim edge is followed by a victim pulse. In the presence of SSO, the slew rate of the victim is reduced.

The transmitting device IO 420-i for each branch, i, of the parallel bus will process the corresponding digital data signal Ai and generate a corresponding transmit signal TXi for transmission. As shown in FIG. 5, the victim pulses 510, 530 of the digital data signals A0 and A2, respectively, will result in SSO in the received version of the corresponding portions 520, 540 of the transmit signals TX0 and TX2, respectively. The receiving device IO 430-i for each branch, i, of the parallel bus receives a version of the corresponding transmit signal TXi and generates a corresponding receive signal RXi.

Figure 6:
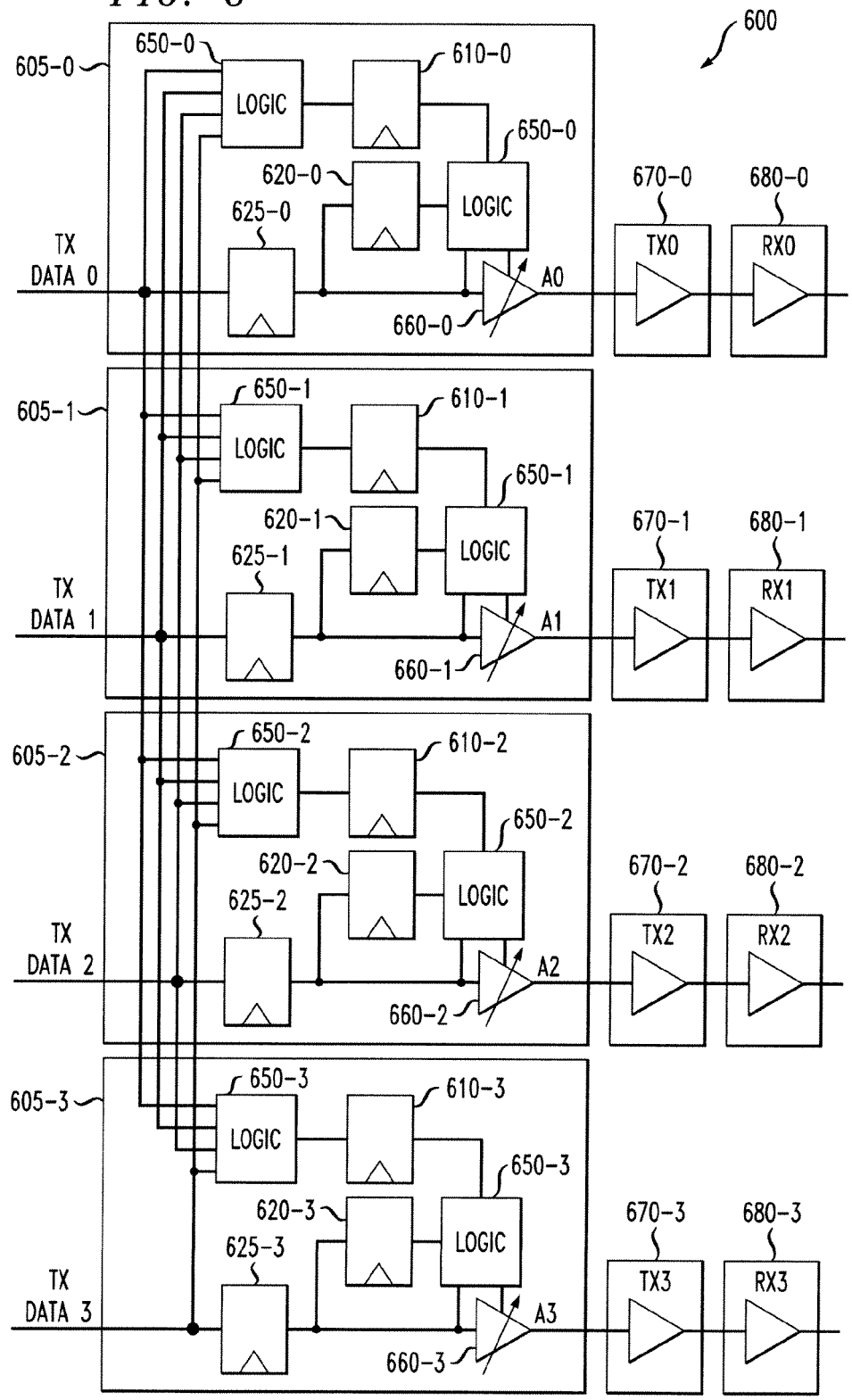
FIG. 6 is a schematic block diagram of an exemplary parallel transmitter/receiver circuit incorporating ISI and SSO compensation in accordance with the present invention.

FIG. 6 is a schematic block diagram of an exemplary parallel transmitter/receiver circuit 600 incorporating ISI and SSO compensation in accordance with the present invention. The bus wide SSO information is available within the digital domain, and employed by the present invention to detect anticipated SSO and thereby incorporate phase shifts prior to the IO driver.

As shown in FIG. 6, the exemplary parallel transmitter/receiver circuit 600 comprises a transmitting IO (TXi) 670-i and a receiving device IO (RXi) 680-i for each branch, i, of the parallel bus, in a similar manner to FIG. 4. In addition, the exemplary parallel transmitter/receiver circuit 600 comprises an ISI/SSO compensation circuit 605-i for each branch, i, of the parallel bus, that each comprise three latches 610-i, 620-i, 625-i, combinatorial logic 650-i and a variable delay circuit 660-i. An exemplary implementation of the combinatorial logic 650-i is discussed further below in conjunction with FIG. 8.

Generally, the combinatorial logic 650 processes the transmit data and selects a delay value for the variable delay circuit 660 based on whether or not the transmit signal is anticipated to exhibit ISI and/or SSO characteristics. As previously indicated, a signal is anticipated to exhibit ISI when the data values encoded in the signal comprise two or more consecutive binary zeroes or binary ones. In addition, a set of signals on parallel branches is anticipated to demonstrate SSO in a given clock cycle when there are a predefined minimum number of parallel branches having aggressor data edges in the transmit data, and a corresponding predefined number of parallel branches having victim data edges in the transmit data, where the victim edges are moving in the opposite direction to the aggressor data edges.

As previously indicated, an aspect of the present invention employs pulse width modulation on the digital data signal Ai to drive the transmit signal TXi early, when the corresponding transmit data is anticipated to demonstrate ISI or SSO (or both). This can be achieved, for example, by reducing the delay of the digital data signal A0, relative to a nominal delay amount, when the transmit data exhibits ISI or SSO (or both). Generally, the disclosed pulse modulation ISI correction is based on the present and saved (prior) serial data. Generally, the disclosed pulse modulation SSO correction is based on the parallel transmit data for a given clock cycle.

Figure 7:
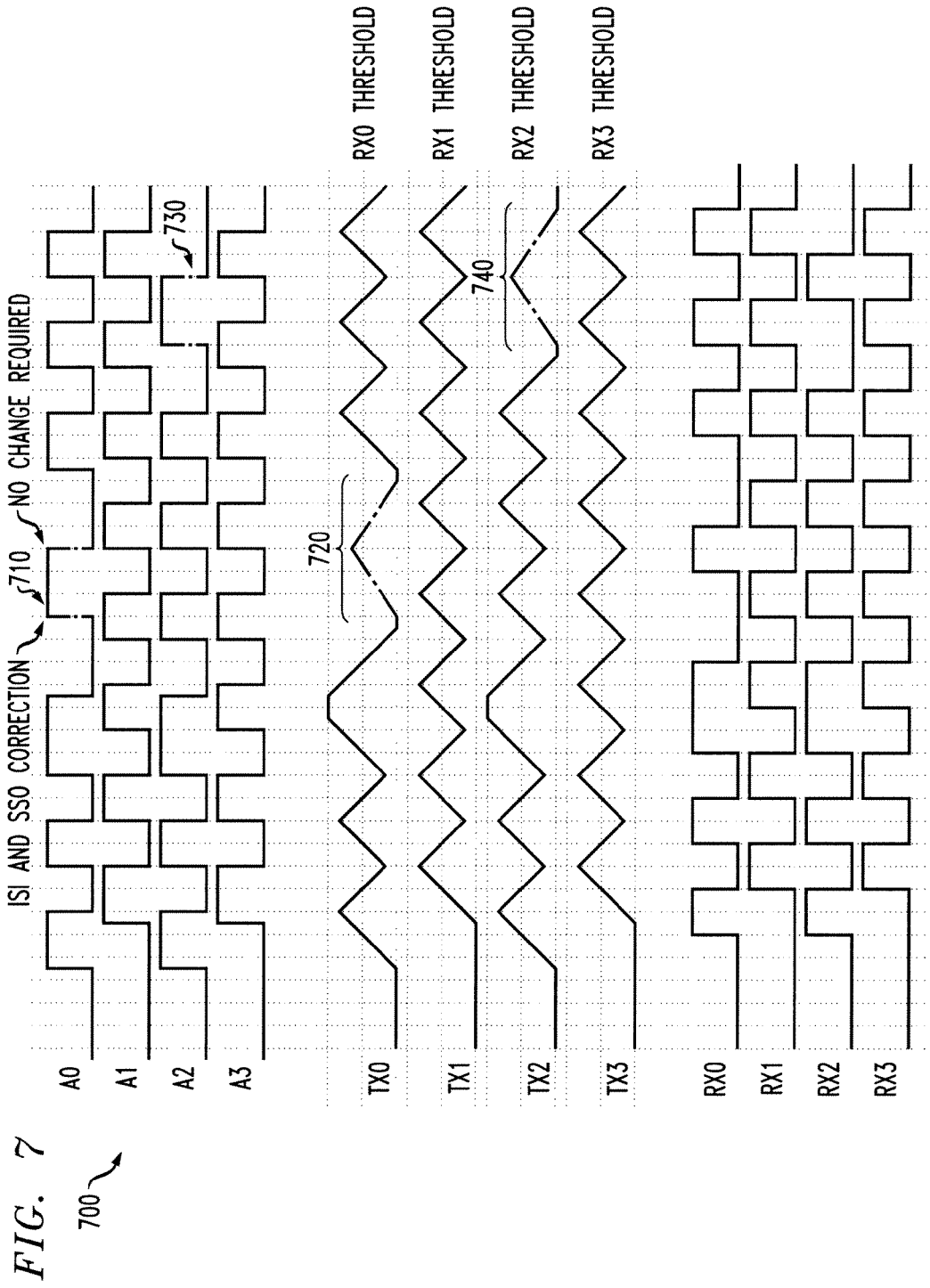
FIG. 7 is a set of waveforms associated with the exemplary parallel transmitter/receiver circuit of FIG. 6.

FIG. 7 is a set of waveforms 700 associated with the exemplary parallel transmitter/receiver circuit 600 of FIG. 6. As shown in FIG. 7, the waveforms 700 comprise Ai, TXi and RXi signals for each branch, i, of the parallel bus. The receiving device IO 680-$i$ detects the received data based on a corresponding threshold, RX Threshold i.

The waveforms 700 show the anticipated ISI and SSO distortion from the transmitting IO (TXi) to the receiving device IO (RXi). For example, at the time associated with data pulse 710, ISI and SSO compensation are performed for digital data signal A0, because there are two consecutive binary zeroes (ISI) in the corresponding transmit data and one victim pulse (shown with dashed lines) in the corresponding transmit data, following a rising victim edge that is moving in the opposite direction to the falling aggressor edges (SSO). In the presence of SSO, the slew rate of the victim is reduced. Thus, ISI and SSO compensation are performed for digital data signal A0 by reducing the delay of the digital data signal A0 during the time associated with data pulse 710, relative to a nominal delay applied to the other parallel signals. The corresponding ISI and SSO compensation is shown in the corresponding transmit signal TX0 (shown with a dashed line) during a time interval 720.

In addition, at the time associated with data pulse 730, ISI and SSO compensation are performed for digital data signal A2, because there are two consecutive binary zeroes (ISI) in the corresponding transmit data and one victim pulse (shown with dashed lines) in the corresponding transmit data, following a rising victim edge that is moving in the opposite direction to the falling aggressor edges (SSO). Thus, ISI and SSO compensation are performed for digital data signal A2 by reducing the delay of the digital data signal A2 during the time associated with data pulse 730, relative to a nominal delay applied to the other parallel signals. The corresponding ISI and SSO compensation is shown in the corresponding transmit signal TX2 (shown with a dashed line) during a time interval 740.

Figure 8:
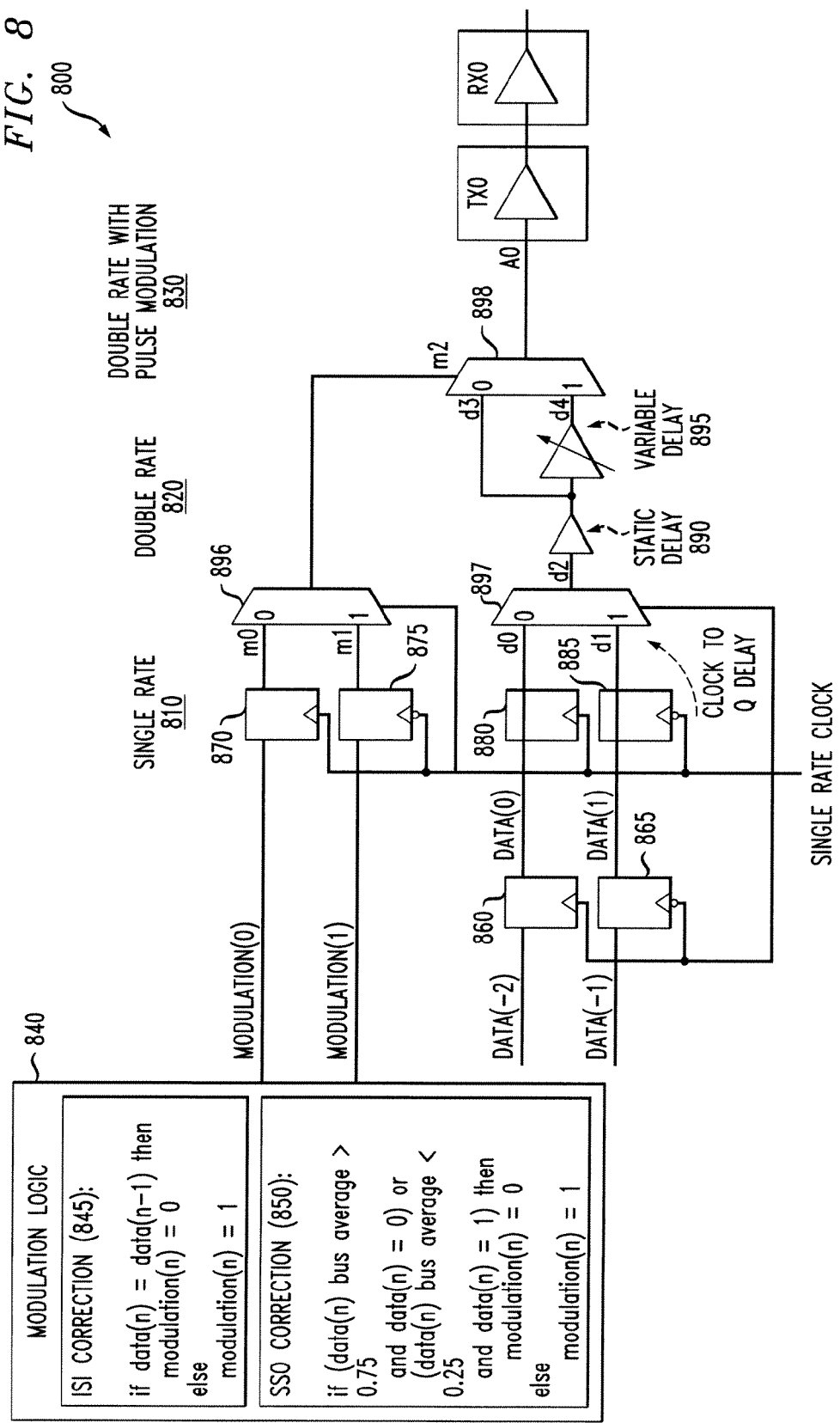
FIG. 8 is a schematic block diagram of an exemplary combinatorial logic circuit.

FIG. 8 is a schematic block diagram of an exemplary combinatorial logic circuit 800. The exemplary combinatorial logic circuit 800 may be used in FIGS. 3 and 6, in the manner discussed above. As shown in FIG. 8, the exemplary combinatorial logic circuit 800 includes an initial region 810 that operates at a single clock rate, a second region 820 that operates at a double clock rate, and a third region 830 that operates at a double clock rate with pulse modulation in accordance with the present invention.

As shown in FIG. 8, the exemplary combinatorial logic circuit 800 includes modulation logic 840 that determines whether ISI and/or SSO compensation is required in accordance with the present invention. Generally, the modulation logic 840 evaluates the transmit data in a given branch for ISI detection and the bus wide transmit data for SSO detection.

In one exemplary embodiment, ISI correction is triggered by logic 845 under the following conditions:

$$\text{if data}(n) = \text{data}(n-1) \text{ then}$$
$$\quad \text{modulation}(n) = 0$$
$$\text{else}$$
$$\quad \text{modulation}(n) = 1$$

In addition, SSO correction is triggered by logic 850 under the following conditions:

$$\text{if ( data}(n) \text{ bus average} > 0.75 \text{ and data}(n) = 0 \text{ ) or}$$
$$\quad \text{( data}(n) \text{ bus average} < 0.25 \text{ data}(n) = 1 \text{ ) then}$$
$$\quad \text{modulation}(n) = 0$$
$$\text{else}$$
$$\quad \text{modulation}(n) = 1$$

It is noted that "data(n) bus average" is an average of all data(n) bits across the data bus for a given clock cycle. It is further noted that only one bit of the data bus is shown in FIG. 8.

In addition, the exemplary combinatorial logic circuit 800 includes pairs of latches 860/865, 870/875 and 880/885 to sample the two bits in each single rate clock cycle. In addition, the exemplary combinatorial logic circuit 800 includes multiplexers 896 and 897 to convert the single rate modulation signals m0, m1 and single rate data signals d0, d1 to double rate signals m2, d2, respectively. Generally, the single rate d0 and d1 signals of a current single rate cycle will appear as the double rate signal d2 at the output of multiplexer 897.

A static delay 890 is optionally applied to the d2 signal to generate a signal d3. In addition, the d3 output of the static delay 890 is further delayed by a variable delay circuit 895, such as a digital delay line. The delay value of the variable delay circuit 895 can be tuned, for example, during a power up training sequence, in a known manner, and then becomes a fixed, static delay. The variable delay circuit 895 setting can be obtained, for example, by a training algorithm that checks for best setup and hold margin at the receiving device (SDRAM). For DDR3/4, the read path may be optimized using SDRAM generated training patterns before any write operations are performed. This ensures read path data integrity during write path training.

The d3 signal is an early path that can be used to drive the TXi signal early, when the transmit signal is anticipated to demonstrate ISI and/or SSO, in the manner described above. This can be achieved, for example, by delaying the TXi signal by selecting the d4 signal, unless the transmit signal exhibits the predefined criteria for ISI and/or SSO. In this manner, the transmit digital data can be selectively driven earlier in time by applying a reduced delay to the transmit digital data (when selecting the d3 signal), relative to a default or nominal delay amount (when selecting the d4 signal).

Generally, the value of the modulation signal, as determined by logic 845, 850 controls the value of the m2 signal, which controls the selected input of the multiplexer 898.

It is noted that the SSO and ISI correction can be separated. For example, an additional modulation stage could be added.

The first stage could correct for ISI and the second stage can correct for SSO. But, any gain in setup and hold margin may be minimal when compared to the added complexity.

Figure 9:
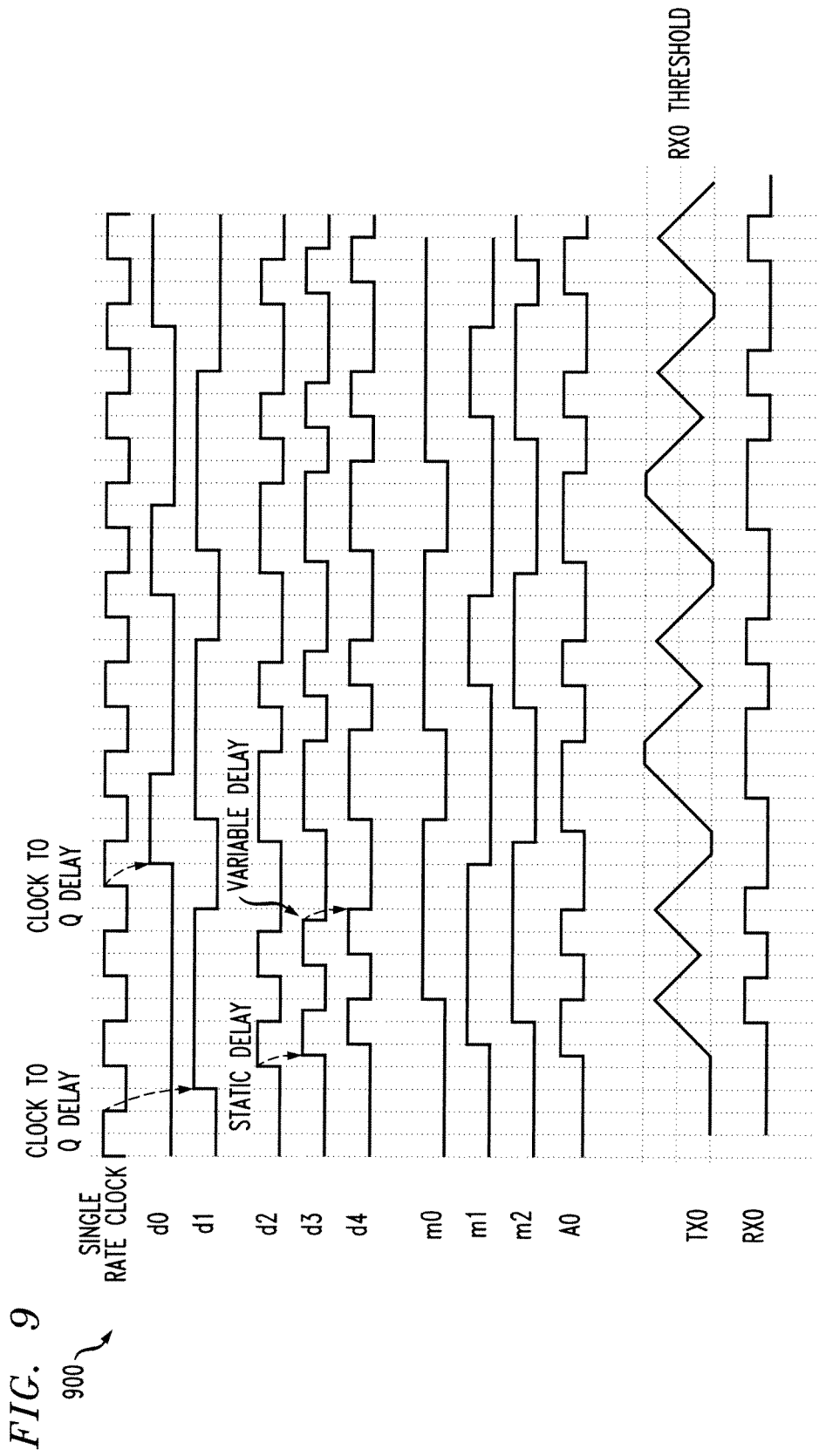
FIG. 9 is a set of waveforms associated with the exemplary combinatorial logic circuit of FIG. 8.

FIG. 9 is a set of waveforms 900 associated with the exemplary combinatorial logic circuit 800 of FIG. 8. As shown in FIG. 9, the waveforms 900 comprise the various data signals d0 through d4, the various modulation signals m0 through m2, as well as the A0, TX0 and RX0 signals. The receiving device IO detects the received data based on a threshold, RX0 threshold.

While the present invention is illustrated in the context of a Double Data Rate (DDR) transmitter/receiver environment, the disclosed ISI compensation techniques can be applied in any serial transmitter/receiver environment (including an individual branch of a parallel bus), as would be apparent to a person of ordinary skill in the art. Likewise, the disclosed SSO compensation techniques can be applied in any parallel transmitter/receiver environment, as would be apparent to a person of ordinary skill in the art. For example, the disclosed ISI and/or SSO compensation techniques can be applied in any wired transmitter/receiver environment, such as a backplane, printed circuit board, conductive cable or fiber optic cable.

A plurality of identical die are typically formed in a repeated pattern on a surface of the wafer. Each die includes a device described herein, and may include other structures or circuits. The individual die are cut or diced from the wafer, then packaged as an integrated circuit. One skilled in the art would know how to dice wafers and package die to produce integrated circuits. Integrated circuits so manufactured are considered part of this invention.

While exemplary embodiments of the present invention have been described with respect to digital logic blocks, as would be apparent to one skilled in the art, various functions may be implemented in the digital domain as processing steps in a software program, in hardware by circuit elements or state machines, or in combination of both software and hardware. Such software may be employed in, for example, a digital signal processor, application specific integrated circuit, micro-controller, or general-purpose computer. Such hardware and software may be embodied within circuits implemented within an integrated circuit.

Thus, the functions of the present invention can be embodied in the form of methods and apparatuses for practicing those methods. One or more aspects of the present invention can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits. The invention can also be implemented in one or more of an integrated circuit, a digital signal processor, a microprocessor, and a micro-controller.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, memory cards, semiconductor devices, chips, application specific integrated circuits (ASICs)) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A system for transmitting one or more signals, comprising:
    combinatorial logic for detecting whether one or more of said signals satisfy one or more predefined signal corruption conditions, wherein said predefined signal corruption conditions indicate that one or more of said signals are anticipated to exhibit one or more of intersymbol interference and simultaneous switching outputs; and
    one or more delay elements for selectively delaying one or more of said signals based on said one or more predefined signal corruptions conditions, wherein said predefined signal corruption conditions comprise a predefined minimum number of aggressor data edges in digital data encoded in said one or more signals, and a corresponding predefined number of victim data edges in said digital data encoded in said one or more signals, wherein said victim edges are moving in an opposite direction to said aggressor data edges.

2. The system of claim 1, wherein the system comprises at least one integrated circuit.

3. The system of claim 1, wherein a nominal delay is applied to one or of said more signals that do not satisfy said predefined signal corruptions conditions.

4. The system of claim 1, wherein a nominal delay is applied to one or more of said signals that are not anticipated to exhibit one or more of said intersymbol interference and said simultaneous switching outputs.

5. The system of claim 1, wherein one or more of said signals that are anticipated to exhibit one or more of said intersymbol interference and said simultaneous switching outputs are transmitted with a reduced delay, relative to a nominal delay value.

6. The system of claim 1, wherein said one or more delay elements selectively delay said one or more of said signals by selecting one or more of a nominal delay value and a reduced delay value for said one or more of said signals, wherein said reduced delay value is relative to said nominal delay value.

7. A method for transmitting one or more signals, comprising:
- detecting whether one or more of said signals satisfy one or more predefined signal corruption conditions, wherein said predefined signal corruption conditions indicate that one or more of said signals are anticipated to exhibit one or more of intersymbol interference and simultaneous switching outputs; and
- selecting a delay for one or more of said signals based on said one or more predefined signal corruptions conditions, wherein said predefined signal corruption conditions comprise a predefined minimum number of aggressor data edges in digital data encoded in said one or more signals, and a corresponding predefined number of victim data edges in said digital data encoded in said one or more signals, wherein said victim edges are moving in an opposite direction to said aggressor data edges.

8. The method of claim 7, wherein a nominal delay is applied to one or of said more signals that do not satisfy said predefined signal corruptions conditions.

9. The method of claim 7, wherein a nominal delay is applied to one or more of said signals that are not anticipated to exhibit one or more of said intersymbol interference and said simultaneous switching outputs.

10. The method of claim 7, wherein one or more of said signals that are anticipated to exhibit one or more of said intersymbol interference and said simultaneous switching outputs are transmitted with a reduced delay, relative to a nominal delay value.

11. The method of claim 7, wherein said step of selecting said delay further comprises the step of selecting one or more of a nominal delay value and a reduced delay value, wherein said reduced delay value is relative to said nominal delay value.

* * * * *